ис012420751B2

United States Patent
Chang (10) Patent No.: US 12,420,751 B2
(45) Date of Patent: Sep. 23, 2025

(54) VEHICLE AND METHOD OF CONTROLLING ELECTRONIC PARKING BRAKE OF THE SAME

(71) Applicants: HYUNDAI MOTOR COMPANY, Seoul (KR); KIA CORPORATION, Seoul (KR)

(72) Inventor: Hwibong Chang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 120 days.

(21) Appl. No.: 18/215,952

(22) Filed: Jun. 29, 2023

(65) Prior Publication Data

US 2024/0140372 A1    May 2, 2024

(30) Foreign Application Priority Data

Nov. 2, 2022   (KR) .................. 10-2022-0144533

(51) Int. Cl.
*B60T 7/12*   (2006.01)
*B60T 13/74*   (2006.01)

(52) U.S. Cl.
CPC .............. *B60T 7/12* (2013.01); *B60T 13/741* (2013.01)

(58) Field of Classification Search
CPC ........ B60T 7/12; B60T 13/741; B60T 17/221; B60R 16/0232; B60Y 2400/81
See application file for complete search history.

(56) References Cited

U.S. PATENT DOCUMENTS

| | | | | |
|---|---|---|---|---|
| 9,789,858 | B1* | 10/2017 | Parikh | ............... B60T 7/22 |
| 2017/0203762 | A1* | 7/2017 | Khafagy | ........... B60W 10/182 |
| 2018/0105178 | A1* | 4/2018 | Khafagy | ............. B60W 10/06 |
| 2018/0237016 | A1* | 8/2018 | Khafagy | .............. B61H 1/00 |
| 2019/0135249 | A1* | 5/2019 | Fridman | ............ F16D 55/226 |
| 2020/0247382 | A1* | 8/2020 | Chang | .............. B60Q 9/002 |
| 2022/0032894 | A1* | 2/2022 | Park | ............... B60T 13/588 |
| 2022/0388487 | A1* | 12/2022 | Hwang | .............. B60T 7/12 |
| 2022/0402470 | A1* | 12/2022 | Toth | ............... B60W 50/035 |

FOREIGN PATENT DOCUMENTS

| | | | | |
|---|---|---|---|---|
| CN | 106335487 | A * | 1/2017 | |
| DE | 102021208306 | A1 * | 2/2022 | ........... B60T 1/065 |
| KR | 18067752 | A * | 2/2022 | |
| WO | WO-2013115355 | A1 * | 8/2013 | ........... B60K 17/35 |
| WO | WO-2017220292 | A1 * | 12/2017 | ............. B60T 7/22 |

* cited by examiner

*Primary Examiner* — Joseph J Dallo
(74) *Attorney, Agent, or Firm* — Morgan, Lewis & Bockius LLP

(57) ABSTRACT

A vehicle and a method of controlling an EPB of the vehicle, include determining whether the vehicle satisfies a predetermined condition for entering a seized release mode of the EPB, implementing the seized release mode of the EPB, and outputting a guide message for a warning and an inspection associated with seizing of the EPB.

20 Claims, 4 Drawing Sheets

110: EPB DEACTIVATE STATE

115: EPB ACTIVATE STATE

FIG. 1

110: EPB DEACTIVATE STATE

115: EPB ACTIVATE STATE

VEHICLE AND METHOD OF CONTROLLING ELECTRONIC PARKING BRAKE OF THE SAME

CROSS-REFERENCE TO RELATED APPLICATION(S)

The present application claims priority to Korean Patent Application No. 10-2022-0144533, filed on Nov. 2, 2022, the entire contents of which is incorporated herein for all purposes by this reference.

BACKGROUND OF THE PRESENT DISCLOSURE

Field of the Present Disclosure

The present disclosure relates to a vehicle, and more particularly, to an electronic parking brake for a vehicle.

DESCRIPTION OF RELATED ART

Generally, vehicles are provided with a parking brake, which includes a manner in which a driver physically pulls a parking brake lever to activate the parking brake and a manner in which an electric actuator is operated by a switch manipulation of a driver to activate the parking brake. The latter is referred to as an electronic parking brake (EPB).

For an EPB, a vehicle maintains a parked/stopped state by generating frictional force by pressing a brake disc with a caliper or a drum by operation of an electric actuator under the control of a brake control unit. When the caliper or drum presses against the brake disc, brake pads of the caliper or drum are pressed against the brake disc. If a vehicle is parked for a long time in a low temperature environment with an EPB activated state, a brake disc and brake pads thereof are stuck to each other due to freezing, so that the activated state of the EPB may not be released (deactivated). Furthermore, in an environment with certain humidity or an environment heavily affected by water, corrosion (e.g., rust) may cause seizing of the brake disc and brake pads.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

According to various aspects of the present disclosure, an activated state of an EPB may be released (deactivate) even when a brake disc and brake pads are seized in a vehicle provided with the EPB.

Various aspects of the present disclosure are directed to providing a method of controlling an electronic parking brake (EPB) of a vehicle is provided. The method includes determining whether the vehicle satisfies a predetermined condition for entering a seized release mode of the EPB, implementing the seized release mode of the EPB, and outputting a guide message for a warning and an inspection associated with seizing of the EPB.

The predetermined condition for entering the seized release mode of the EPB may include a condition in which the EPB is not deactivated within a predetermined time period after a deactivation command of the EPB is occurred, a condition in which all doors of the vehicle are closed and one or more seat belt of the vehicle are fastened, and a condition in which no object is detected from front and rear sides of the vehicle.

The predetermined condition for entering the seized release mode of the EPB may further include a condition in which no failure is found in the EPB of the vehicle after an ignition of the vehicle is turned on, and a condition in which an operation of an accelerator pedal of the vehicle is occurred after the ignition of the vehicle is turned on.

The fastening of the seat belt may be fastening of a seat belt of a seat where an occupant is present.

The seized release mode of the EPB may further include generating braking force to a first wheel of the vehicle through a brake caliper of the first wheel which is a non-driving wheel and to which a function of the EPB is not applied, alternately repeating deactivation and activation attempts of the function of the EPB of a brake caliper of a second wheel which is a driving wheel and to which the EPB is applied, and alternately generating driving force in a forward direction and a backward direction to the second wheel to which the EPB is applied.

The driving force in the forward direction and the backward direction of the second wheel may be maintained for a predetermined time period while linearly increasing a rotation speed of an engine of the vehicle from 0 revolutions per minute (RPM) to a predetermined revolutions per minute (rpm) greater than 0, and the seized release mode of the EPB repeats the steps of claim 5 a predetermined number of times.

The seized release mode of the EPB may further include for a predetermined time period suspending constant monitoring to confirm a failure of the EPB of the vehicle.

The method may further include resuming the constant monitoring of the EPB upon confirming that a seized state of the EPB is released.

The method may further include releasing a braking state of the first wheel upon confirming that the seized state of the EPB is released.

The seized release mode of the EPB may further include confirming an intention of a driver to enter the seized release mode of the EPB.

In accordance with another aspect of the present disclosure, a vehicle includes a first wheel of the vehicle which is a non-driving wheel, a second wheel which is a driving wheel and to which a function of an electronic parking brake (EPB) is applied, and a controller configured to determine whether the vehicle satisfies a predetermined condition for entering a seized release mode of the EPB, implement the seized release mode of the EPB, and output a guide message for a warning and an inspection associated with seizing of the EPB.

The predetermined condition for entering the seized release mode of the EPB may include a condition in which the EPB is not deactivated within a predetermined time period after a deactivation command of the EPB is occurred, a condition in which all doors of the vehicle are closed and one or more seat belt of the vehicle are fastened, and a condition in which no object is detected from front and rear sides of the vehicle.

The predetermined condition for entering the seized release mode of the EPB may further include a condition in which no failure is found in the EPB of the vehicle after an ignition of the vehicle is turned on, and a condition in which an operation of an accelerator pedal of the vehicle is occurred after the ignition of the vehicle is turned on.

The fastening of the seat belt may be fastening of a seat belt of a seat where an occupant is present.

In the seized release mode of the EPB, the controller may further generate braking force to the first wheel through a brake caliper of the first wheel, alternately repeat deactivation and activation attempts of the function of the EPB of a brake caliper of the second wheel, and alternately generate driving force in a forward direction and a backward direction to the second wheel.

The driving force in the forward direction and the backward direction of the second wheel may be maintained for a predetermined time period while linearly increasing a rotation speed of an engine of the vehicle from 0 revolutions per minute (RPM) to a predetermined revolutions per minute (rpm) greater than 0, and in the seized release mode of the EPB, the controller is further configured to repeat the processes of claim 15 a predetermined number of times.

In the seized release mode of the EPB, the controller may further suspend, for a predetermined time period, constant monitoring to confirm a failure of the EPB of the vehicle.

The controller may further resume, upon confirming that a seized state of the EPB is released, the constant monitoring of the EPB.

The controller may further release, upon confirming that the seized state of the EPB is released, a braking state of the first wheel.

In the seized release mode of the EPB, the controller may further confirm an intention of a driver to enter the seized release mode of the EPB.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplarily embodiments of the present disclosure, examples of which are illustrated in the accompanying drawings, wherein like reference numerals refer to like elements throughout. The present specification does not describe all elements of the disclosed exemplarily embodiments and detailed descriptions of what is well known in the art or redundant descriptions on substantially the same configurations have been omitted. The terms 'part', 'module', 'member', 'block' and the like as used in the specification may be implemented in software or hardware. Furthermore, a plurality of 'part', 'module', 'member', 'block' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements included in the specification, and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it includes a clearly different meaning in the context.

The reference numerals used in operations are used for descriptive convenience and are not intended to describe the order of operations and the operations may be performed in a different order unless otherwise stated.

Hereinafter, various embodiments of the present disclosure will be described in detail with reference to the accompanying drawings.

Figure 1:
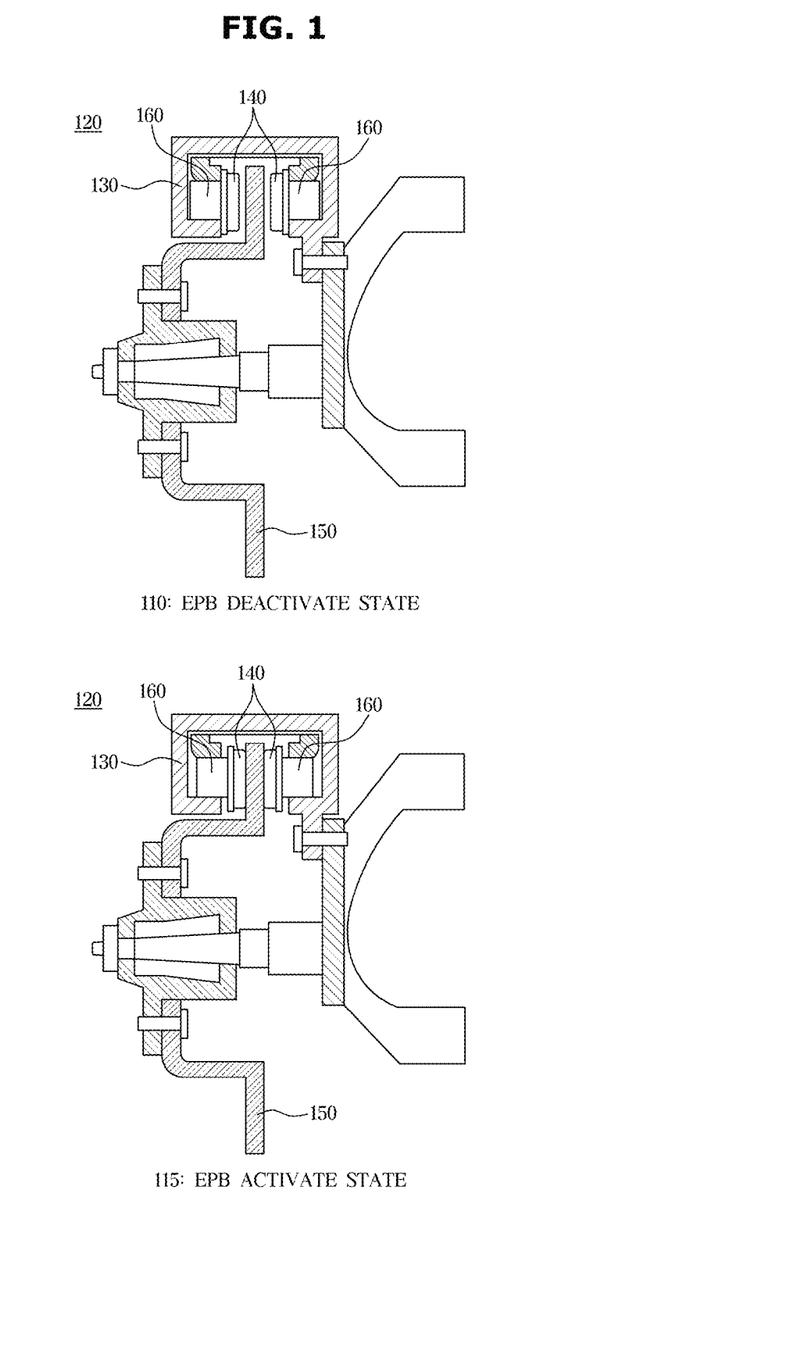
FIG. 1 is a view exemplarily illustrating an electronic parking brake of a vehicle according to an exemplary embodiment of the present disclosure.

FIG. 1 is a view exemplarily illustrating an electronic parking brake (EPB) of a vehicle according to an exemplary embodiment of the present disclosure.

Referring to FIG. 1, reference numeral 110 indicates a state in which the EPB 120 is deactivated. As can be seen from reference numeral 110, a brake pad 140 of a brake caliper 130 does not press against a brake disc 150 when the EPB 120 is deactivated. Reference numeral 115 indicates a state in which the EPB 120 is activated. As may be seen from reference numeral 115, in the state of that the EPB 120 being activated, the brake pad 140 presses against the brake disc 150 by action of a piston 160.

Accordingly, if the EPB 120 is activated and the brake pad 140 is left for a long time in a state in which the brake disc 150 is pressed, phenomena such as freezing or rust may occur on the brake pad 140 and the brake disc 150. As a result, the brake pad 140 and the brake disc 150 may be stuck to each other and may not be separated, so that a problem that the EPB 120 is not released (remains activated) even when the EPB 120 should be released (deactivated) may be caused. The present disclosure is directed to solve a stuck (or seizure) problem of the brake pad 140 and the brake disc 150.

Figure 2:
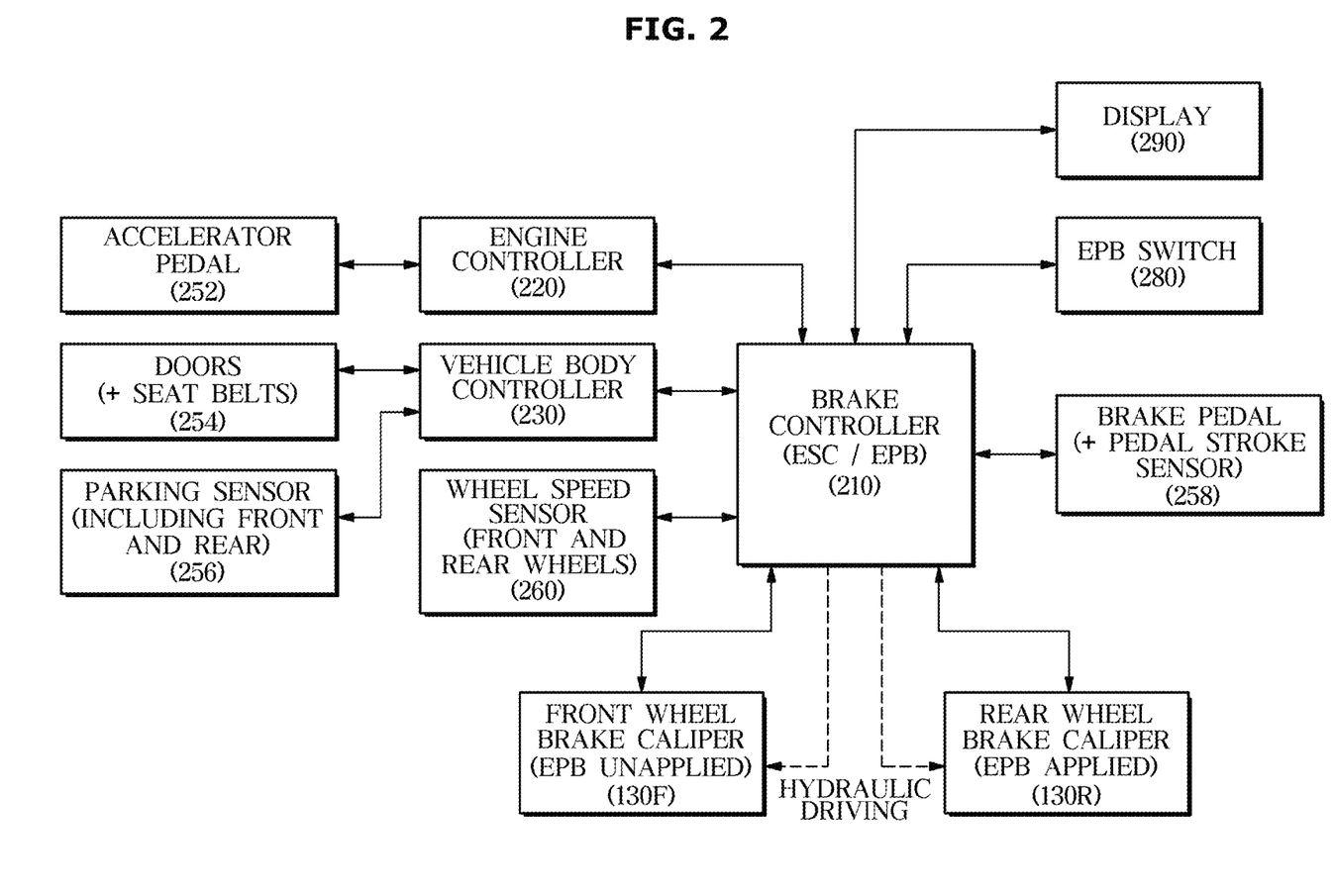
FIG. 2 is a view exemplarily illustrating a control system of a vehicle according to an exemplary embodiment of the present disclosure.

FIG. 2 is a view exemplarily illustrating a control system of a vehicle according to an exemplary embodiment of the present disclosure.

As shown in FIG. 2, in a vehicle according to an exemplary embodiment of the present disclosure, a brake controller 210, an engine controller 220, a vehicle body controller 230, an accelerator pedal 252, doors (including seat belts) 254, a parking sensor 256, a brake pedal 258, a wheel speed sensor 260, a front wheel brake caliper 130F, and a rear wheel brake caliper 130R may be connected to communicate with each other to form one control system.

The brake controller 210 may be configured for controlling overall braking operation of the vehicle. In other words, driving force for braking is generated through the piston 160 shown in FIG. 1, and driving force of the piston 160 is adjusted according to an amount of operation of the brake pedal 258 by a driver. In an exemplary embodiment of the present disclosure, the brake controller 210 addresses the stuck problem of the brake pad 140 and the brake disk 150 through a sticking release mode of the EPB.

The engine controller 220 may be configured for controlling overall operation of an engine (not shown). By controlling the engine in response to a driver's manipulation of the accelerator pedal 252, the engine controller 220 may be configured to generate output (power) corresponding to an amount of manipulation of the accelerator pedal 252 in the engine.

The vehicle body controller 230 is involved in integrated control of various systems of the vehicle, and may be configured for controlling various electric components of the vehicle. For example, the vehicle body controller 230 may be configured for controlling ON/OFF of vehicle lights, lock/unlock of doors, wipers, heating wires, and the like.

The accelerator pedal 252 is a device configured for allowing the driver to manipulate a throttle opening of the engine. The amount of engine output (power) is determined based on the amount of operation of the accelerator pedal 252 by the driver.

The doors (including seat belts) 254 may include a tailgate, a trunk door, and an engine room hood together with a door configured for getting in of occupants. In the exemplary embodiment of the present disclosure, when performing a seized release mode of the EPB, it is identified whether all doors 254 are normally closed for a safety of occupants. Furthermore, although function thereof is different from the doors, it is also identified whether the seat belts are fastened in consideration of the safety of occupants.

The parking sensors 256 are mounted on front and rear of the vehicle to detect a distance between the vehicle and a pedestrian or a structure before and behind of the vehicle. An alarm may be generated when the distance between the vehicle and a pedestrian or a structure before and rear of the vehicle is located within a predetermined distance. It is mainly used when parking a vehicle.

The brake pedal 258 is a device configured for allowing the driver to generate braking force for decelerating/stopping the vehicle. The amount of braking force is determined based on the amount of operation of the brake pedal 258 by the driver. The brake pedal 258 is provided with a pedal stroke sensor (not shown), and the amount of operation of the brake pedal 258 by a user may be detected through the pedal stroke sensor.

The wheel speed sensor 260 is provided to detect the rotation speed of each of four wheels (front left (LF), front right (RF), rear left (LR), and rear right (RR)) of the vehicle.

The front wheel brake caliper 130F (including LF and/or RF) refers to one mounted on the front wheels of the vehicle among the brake calipers 130 described above with reference to FIG. 1.

The rear wheel brake caliper 130R (including LR and/or RR) refers to one mounted on the rear wheels of the vehicle among the brake calipers 130 described above with reference to FIG. 1. In the exemplary embodiment of the present disclosure, the EPB 120 is applied only to the rear wheel brake caliper 130R of the rear wheel, which is driving wheel.

A switch 280 of the EPB is provided so that the driver may activate/deactivate the EPB 120 of the vehicle. The driver may switch from the deactivated state (110 in FIG. 1) to the activated state (115 in FIG. 1) of the EPB 120 through the EPB switch 280, or vice versa. As described above in the description of the rear wheel brake caliper 130R, according to the exemplary embodiment of the present disclosure, the EPB 120 is applied only to the rear wheel brake caliper 130R, and is not applied to the front wheel brake caliper 130F.

A display 290 may be a display of a multimedia device of the vehicle or a display of a cluster of the vehicle. The display 290 may be used to display a guide message related to the seized release mode of the EPB 120 of the vehicle according to an exemplary embodiment of the present disclosure.

The controller may be implemented with a memory storing data for an algorithm or a program reproducing the algorithm for controlling operations of components in the vehicle, and a processor performing the above-described operations using the data stored in the memory. In the present case, the memory and the processor may be implemented as separate chips. Alternatively, the memory and the processor may be implemented as a single chip.

The communicator may include one or more components enabling communication with external devices, and may include, for example, at least one of a short-range communication module, a wired communication module, and a wireless communication module.

The short-range communication module may include various short-range communication modules that exchange signals using a wireless communication network at a short distance, such as a Bluetooth module, an infrared communication module, a Radio Frequency Identification (RFID) communication module, a Wireless Local Access Network (WLAN) communication module, a Near Field Communication (NFC) module, and a Zigbee communication module, and the like.

The wired communication modules may include various cable communications, such as Universal Serial Bus (USB), High definition multimedia interface (HDMI), Digital Visual Interface (DVI), Recommended Standard (RS)-232, a power line communication, or a plain old telephone service (POTS) modules, as well as various wired communication modules, such as Controller Area Network (CAN) communication modules, Local Area Network (LAN) modules, Wide Area Network (WAN) modules, or Value Added Network (VAN) modules, and the like.

The wireless communication modules may include, in addition to the WiFi module and the WiBro module, Global System for Mobile communication (GSM), Code Division Multiple Access (CDMA), Wideband Code Division Multiple Access (WCDMA), Universal Mobile Telecommunications System (UMTS), Time Division Multiple Access (TDMA), or Long Term Evolution (LTE), and the like.

The wireless communication module may include a wireless communication interface including an antenna and a transmitter for transmitting signals. Furthermore, the wireless communication module may further include a XX signal conversion module that modulates a digital control signal output from the controller through a wireless communication interface under control of the controller into an analog type of wireless signal.

The wireless communication module may include a wireless communication interface including an antenna and a receiver for receiving signals. Furthermore, the wireless communication module may further include a signal conversion module that demodulates an analog type of wireless signal received through the wireless communication interface into a digital control signal.

The storage may be implemented as at least one of a non-volatile memory device such as a cache, a Read Only Memory (ROM), a Programmable ROM (PROM), an erasable programmable ROM (EPROM), an Electrically Erasable Programmable ROM (EEPROM), and a flash memory, or a volatile memory device such as a Random Access Memory (RAM), or a storage medium such as a Compact Disk (CD)-ROM, but is not limited thereto. The storage may be a memory implemented as a separate chip from the processor described above in relation to the controller, or may be implemented as a single chip with the processor.

The display may include a Cathode Ray Tube (CRT), a Digital Light Processing (DLP) panel, a Plasma Display Panel (PDP), a Liquid Crystal Display (LCD) panel, an Electro Luminescence (EL) panel, an Electrophoretic Display (EPD) panel, an Electrochromic Display (ECD) panel, a Light Emitting Diode (LED) panel, or Organic Light Emitting Diode (OLED) panel, and the like, but is not limited thereto.

An input device may include hardware devices such as various buttons, switches, pedals, keyboards, mice, trackballs, various levers, handles, and sticks for user input.

Furthermore, the input device may include a Graphical User Interface (GUI), that is, a software device, such as a touch pad for user input. The touch pad is implemented as a Touch Screen Panel (TSP) and may form a multiple layer structure with the display.

When composed of TSP forming a multiple layer structure with a touch pad, the display may also be used as the input device.

At least one component may be added or deleted corresponding to the performance of components of the vehicle shown in FIG. 2. Furthermore, it should be easily understood by those skilled in the art that the mutual positions of the components may be changed corresponding to the performance or structure of the system.

On the other hand, each component shown in FIG. 2 refers to software and/or hardware components such as a Field Programmable Gate Array (FPGA) and an Application Specific Integrated Circuit (ASIC).

Figure 3:
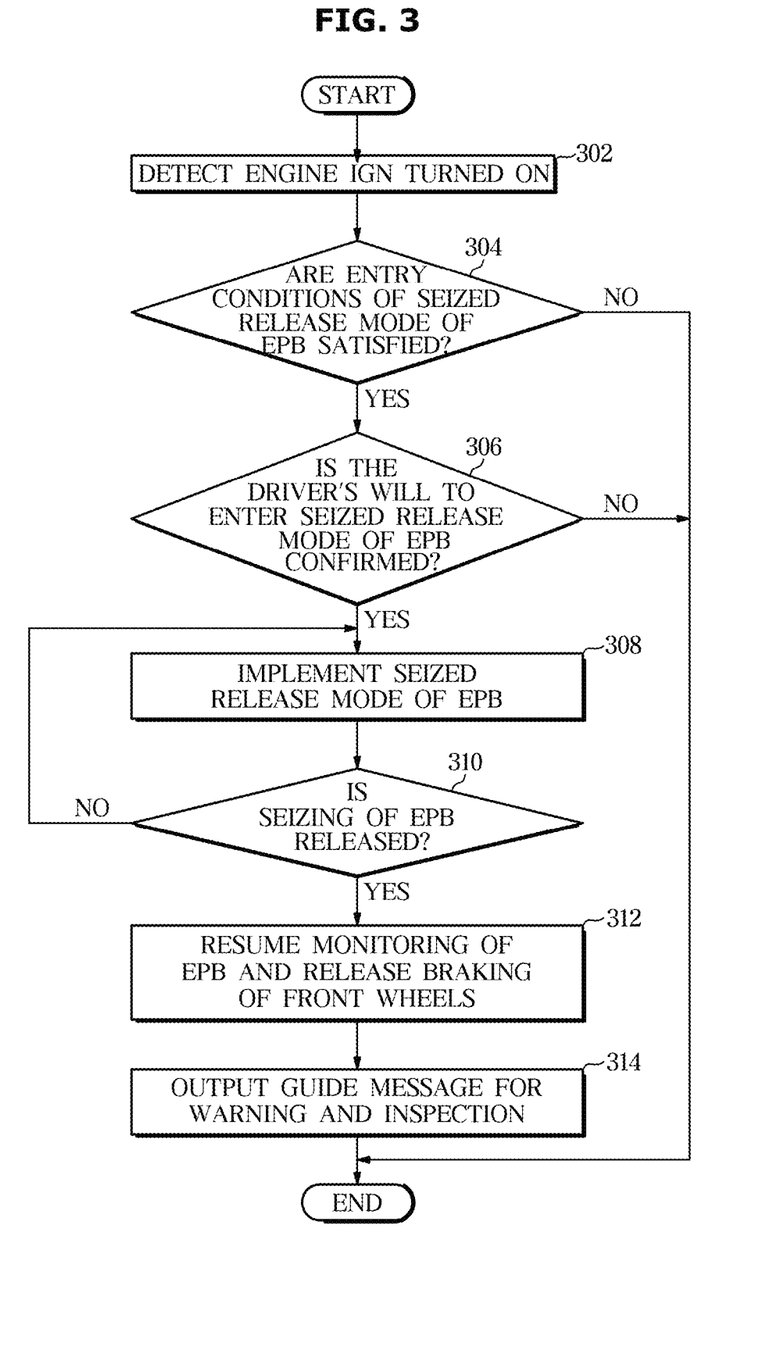
FIG. 3 is a view exemplarily illustrating a method for controlling an electronic parking brake of a vehicle according to an exemplary embodiment of the present disclosure.

FIG. 3 is a view exemplarily illustrating a method for controlling the EPB of the vehicle according to an exemplary embodiment of the present disclosure. Based on the method for controlling the EPB of the vehicle shown in FIG. 3, the stuck problem between the brake pad 140 and the brake disk 150 of the EPB 120 may be solved.

The engine controller 220 may detect that the engine is switched to an ignition-on state, and in response to the engine being switched to the ignition-on state, transmit that the engine is in the ignition-on state to the brake controller 210 (302).

When the engine is switched to the ignition-on state, the brake controller 210 may identify whether all conditions for entering the seized release mode of the EPB 120 of the vehicle are satisfied (304). Conditions for entering the seized release mode of the EPB 120 of the vehicle according to an exemplary embodiment of the present disclosure are as follows. When all of the following conditions are satisfied, the EPB 120 of the vehicle may enter the seized release mode. Alternatively, if necessary, the EPB 120 of the vehicle may enter the seized release mode when only some of the conditions determined to be essential among the following conditions are also satisfied.

Condition 1: No failure is found in the EPB 120 when a failure of the vehicle is confirmed after ignition thereof is turned on The vehicle confirms whether there are failures in all controllers after the ignition is turned on (preferably within a few seconds after the ignition is turned on). At the instant time, it is possible to enter the seized release mode of the EPB only when the failure thereof is not found. To the present end, the brake controller 210 may constantly monitor whether the EPB 120 is failed.

Condition 2: The EPB 120 is not deactivated within a predetermined time period (for example, 3 seconds) despite an occurrence of a deactivation command of the EPB by operating the EPB switch 280 or shifting a gear ratios.

Condition 3: Operation of the accelerator pedal is occurred after the engine ignition is turned on.

Because the vehicle does not move unless the EPB is released, the driver operates the accelerator pedal 252 to deactivate (release) the EPB. Accordingly, the brake controller 210 may be configured to determine whether to enter the seized release mode of the EPB 120 through whether or not the accelerator pedal is operated in condition 3, in addition to conditions 1 and 2 described above and conditions 4 and 5 to be described below.

Condition 4: All doors are closed and seat belts are fastened

To ensure the safety of occupants during the seized release mode, when all doors 254 of the vehicle are closed and all seat belts of the occupants are fastened, it is possible to enter the seized release mode of the EPB 120. To the present end, the brake controller 210 may receive closed/open information of the doors 254 and fastened/unfastened state information of the seat belt from the vehicle body controller 230 through CAN communication.

Condition 5: An object is not detected from front and rear sides of the vehicle

To ensure the safety of objects (especially pedestrians) around the vehicle while performing the seized release mode, when no object is detected from the front side and the rear side of the vehicle within a certain distance, it is possible to enter the seized release mode of the EPB 120. To the present end, the brake controller 210 may receive detection information of the parking sensor 256 from the vehicle body controller 230 through CAN communication.

Next, the braking controller 210 confirms an intention of the driver as to whether or not to enter the seized release mode of the EPB 120 (306). An exemplary embodiment of the present disclosure allows driving and braking of the vehicle to be performed automatically without the driver's manipulation when performing the seized release mode of the EPB 120, so that it is necessary to prevent the driver from being surprised or flustered by confirming in advance the driver's intention for entering the seized release mode of the EPB 120. Accordingly, it is preferable to confirm the driver's intention for entering the seized release mode of the EPB 120 and enter the seized release mode of the EPB 120 only when the driver approves.

To the present end, the brake controller 210 may display a first guide message asking the driver whether to enter the seized release mode of the EPB 120 on the display 290 through the vehicle controller 230.

In response to the first guide message, when the driver allows the EPB 120 to enter the seized release mode, the brake controller 210 cooperates with the engine controller 220 and the vehicle body controller 230 to start the seized release mode of the EPB 120 according to an exemplary embodiment of the present disclosure.

Furthermore, the brake controller 210 may display a second guide message configured for informing the driver of that driving and braking of the vehicle may be performed automatically when the seized release mode of the EPB 120 is performed on the display 290. Furthermore, the second guide message may be continuously displayed on the display until the seized release mode of the EPB 120 is completed. Furthermore, displaying (pop-up) of the second guide message while the seized release mode of the EPB 120 is being performed takes precedence over displaying (pop-up) of other messages.

Next, in response to the permission of the driver, the brake controller 210 cooperates with the engine controller 220 and the vehicle body controller 230 to implement the seized release mode of the EPB 120 of the vehicle (308). The seized release mode of the EPB 120 of the vehicle according to an exemplary embodiment of the present disclosure is described with reference to FIG. 4 as follows.

Figure 4:
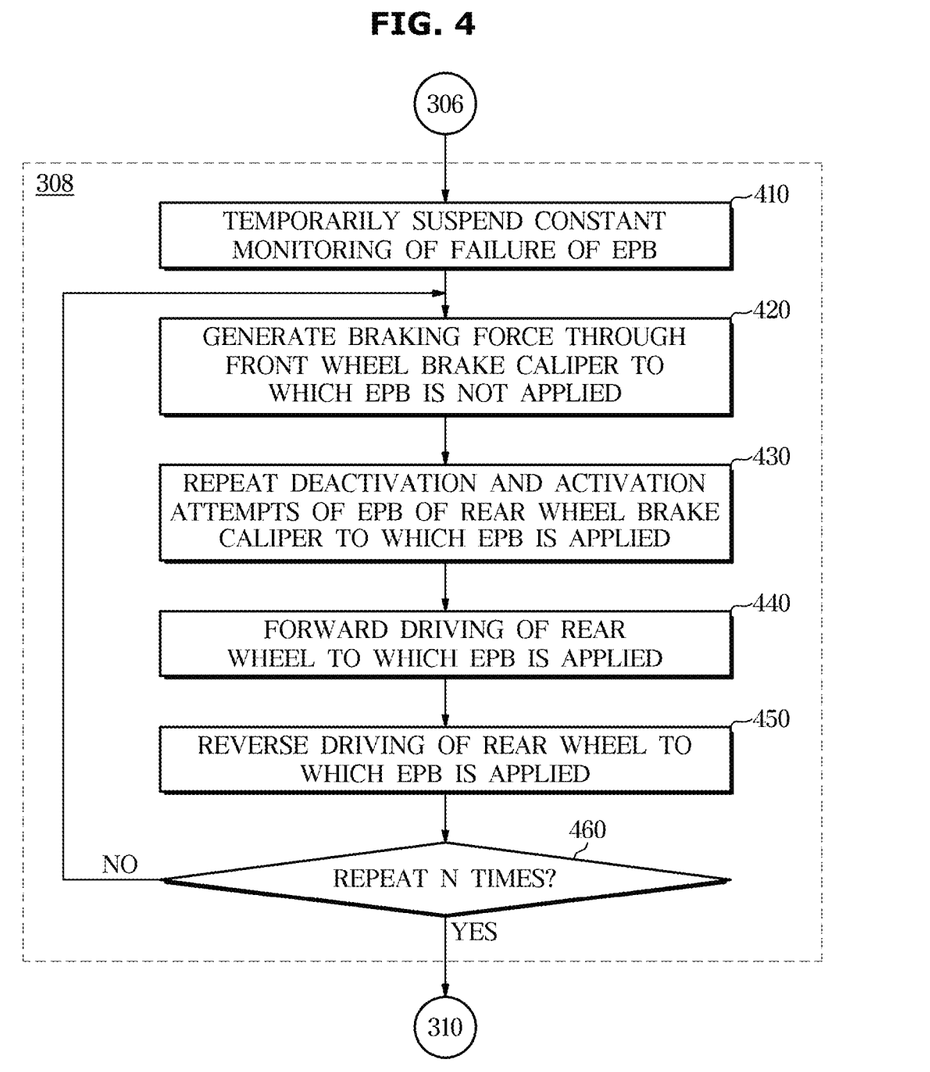
FIG. 4 is a view exemplarily illustrating a seized release mode of the electronic parking brake 120 of a vehicle according to an exemplary embodiment of the present disclosure.

FIG. 4 is a view exemplarily illustrating the seized release mode of the EPB 120 of the vehicle according to an exemplary embodiment of the present disclosure.

As shown in FIG. 4, first, the brake controller 210 temporarily suspends the constant monitoring of the failure of the EPB 120 of the vehicle to implement the seized release mode of the EPB 120 (410).

The brake controller 210 generates braking force on the front wheels of the vehicle by applying a certain amount of hydraulic pressure (e.g., 140 bar) to the front wheel brake caliper 130F to which the function of the EPB is not applied to prevent the vehicle from moving (420). Accordingly, the generation of braking force through the front wheel brake caliper 130F to which the EPB is not applied continues until a driving of the vehicle in the reverse direction (450), which will be described later, is completed.

The brake controller 210 repeats deactivation and activation attempts of the EPB function of the rear wheel brake caliper 130R to which the EPB function is applied (430). To the present end, deactivation and activation of the rear wheel brake caliper 130R may be alternately attempted for each predetermined time period (e.g., 1 second each). In other words, the seized state of the brake pad 140 and the brake disk 150 of the rear wheel may be reduced by alternately attempting to deactivate and activate the rear wheel brake caliper 130R.

The brake controller 210 cooperates with the engine controller 220 to generate driving force in the forward direction to the rear wheel, which is driving wheel and as well as to which the EPB is applied (440). At the instant time, a generation condition of driving force may be, for example, maintaining the rotation speed of the engine for 2 seconds while increasing linearly from 0 revolutions per minute (rpm) to 1,000 RPM. The seized state of the brake pad 140 and the brake disc 150 of the rear wheel may be reduced through the generation of driving force in the forward direction of the rear wheel.

The brake controller 210 cooperates with the engine controller 220 to generate driving force in the reverse direction to the rear wheel, which is driving wheel and as well as to which the EPB is applied (450). At the instant time, a generation condition of driving force may be, for example, maintaining the rotation speed of the engine for 2 seconds while increasing linearly from 0 revolutions per minute (rpm) to 1,000 RPM. The seized state of the brake pad 140 and the brake disk 150 of the rear wheel may be reduced through the generation of driving force in the reverse direction of the rear wheel.

The brake controller 210 releases braking force of the front wheels and proceeds to operation 310 after repeating operations 420 to 450 a predetermined number of times (for example, 3 times) (460).

Returning to FIG. 3, the brake controller 210 confirms whether the seized state of the EPB 120 of the rear wheel is released through the seized release mode (308), which is described above, of the EPB 120 (310). A method for confirming whether the seized state of the EPB 120 of the rear wheel is released is, for example, confirming whether a predetermined wheel speed (e.g., 3 kph or more) generates in the rear wheels when driving the rear wheel, which includes the EPB and is driving wheel. When the wheel speed is higher than a certain speed in the rear wheel, it may be seen that the seized state of the brake pad 140 and the brake disk 150 of the rear wheel has been released.

Upon determining that the seizing between the brake pad 140 and the brake disc 150 of the rear wheel to which the EPB is applied is released ('yes' in 310), the brake controller 210 resumes the monitoring of the failure of the EPB 120, which was stopped in operation (410) of FIG. 4, and also stops the generation of braking force of the front wheels shown in operation 420 of FIG. 4 (312). Upon determining that the seizing between the brake pad 140 and the brake disk 150 of the rear wheel to which the EPB is applied has not yet been released ('No' in 310), the brake controller 210 may continue the seized release mode.

Furthermore, the brake controller 210 may cooperate with the vehicle body controller 230 to output a guide message for a warning and an inspection associated with seizing of the EPB 120, through the display 290 (314). For example, the message may include a content such as "A visit to a service center is recommended because diagnosis of the pads/disk of the electronic parking brake is required." A problem may occur due to the seizing of the brake pad 140 and the brake disc 150 of the EPB 120, it is preferable to output such the guide message so that the driver may confirm states of the vehicle.

As is apparent from the above, according to various embodiments of the present disclosure, the activated state of the EPB may be released (deactivate) even when the brake disc and the brake pad are stuck in a vehicle provided with the EPB.

On the other hand, the above-described embodiments may be implemented in the form of a recording medium storing instructions executable by a computer. The instructions may be stored in the form of program code. When the instructions are executed by a processor, a program module is generated by the instructions so that the operations of the disclosed exemplary embodiments of the present disclosure may be carried out. The recording medium may be implemented as a computer-readable recording medium.

The computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method disclosed in the aforementioned various exemplary embodiments of the present disclosure.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

A singular expression includes a plural expression unless the context clearly indicates otherwise.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling an electronic parking brake (EPB) of a vehicle, the method comprising:
   determining, by a controller, whether the vehicle satisfies a predetermined condition for entering a seized release mode of the EPB;
   implementing, by the controller, a seized release mode of the EPB, in response that the controller concludes that the vehicle satisfies the predetermined condition for entering the seized release mode of the EPB; and
   outputting, by the controller, a guide message for a warning and an inspection associated with seizing of the EPB on a display device,
   wherein the vehicle includes a first wheel and a second wheel, and
   wherein implementing the seized release mode of the EPB includes:
      generating a braking force to the first wheel of the vehicle through a brake caliper of the first wheel which is a non-driving wheel and to which a function of the EPB is not applied; and
      alternately repeating deactivation and activation attempts of a function of the EPB of a brake caliper of the second wheel which is a driving wheel and to which the EPB is applied.

2. The method of claim 1, wherein the predetermined condition for entering the seized release mode of the EPB includes:
   a condition in which the EPB is not deactivated within a predetermined time period after a deactivation command of the EPB is occurred;
   a condition in which all doors of the vehicle are closed and one or more seat belt of the vehicle are fastened; and
   a condition in which no object is detected in front and rear sides of the vehicle.

3. The method of claim 2, wherein the predetermined condition for entering the seized release mode of the EPB further includes:
   a condition in which no stoppage is found in the EPB of the vehicle after an ignition of the vehicle is turned on; and
   a condition in which an operation of an accelerator pedal of the vehicle is occurred after the ignition of the vehicle is turned on.

4. The method of claim 2, wherein the fastening of the seat belt is fastening of a seat belt of a seat where an occupant is present.

5. The method of claim 1,
wherein the implementing of the seized release mode of the EPB includes:
alternately generating a driving force in a forward direction and a backward direction to the second wheel to which the EPB is applied.

6. The method of claim 5,
wherein the driving force in the forward direction and the backward direction of the second wheel are maintained for a predetermined time period while linearly increasing a rotation speed of an engine of the vehicle from 0 revolutions per minute to a predetermined revolutions per minute greater than 0, and
wherein the seized release mode of the EPB repeats the steps of claim 5 a predetermined number of times.

7. The method of claim 5, wherein the seized release mode of the EPB further includes:
for a predetermined time period suspending, by the controller, constant monitoring of the EPB to confirm a stoppage of the EPB of the vehicle.

8. The method of claim 7, further including resuming, by the controller, the constant monitoring of the EPB upon confirming that a seized state of the EPB is released.

9. The method of claim 7, further including releasing, by the controller, a braking state of the first wheel upon confirming that the seized state of the EPB is released.

10. The method of claim 1, wherein the seized release mode of the EPB includes confirming, by the controller, an intention of a driver from the driver's approval to enter the seized release mode of the EPB.

11. A vehicle, comprising:
a first wheel of the vehicle which is a non-driving wheel;
a second wheel which is a driving wheel and to which a function of an electronic parking brake (EPB) is applied;
a display device configured to display information; and
a controller configured to:
determine whether the vehicle satisfies a predetermined condition for entering a seized release mode of the EPB;
implement the seized release mode of the EPB, in response that the controller concludes that the vehicle satisfies the predetermined condition for entering the seized release mode of the EPB; and
output a guide message for a warning and an inspection associated with seizing of the EPB on the display device,
wherein the controller is configured to:
generate braking force to the first wheel through a brake caliper of the first wheel; and
alternately repeat deactivation and activation attempts of a function of the EPB of a brake caliper of the second wheel.

12. The vehicle of claim 11, wherein the predetermined condition for entering the seized release mode of the EPB includes:
a condition in which the EPB is not deactivated within a predetermined time period after a deactivation command of the EPB is occurred;
a condition in which all doors of the vehicle are closed and one or more seat belt of the vehicle are fastened; and
a condition in which no object is detected in front and rear sides of the vehicle.

13. The vehicle of claim 12, wherein the predetermined condition for entering the seized release mode of the EPB further includes:
a condition in which no stoppage is found in the EPB of the vehicle after an ignition of the vehicle is turned on; and
a condition in which an operation of an accelerator pedal of the vehicle is occurred after the ignition of the vehicle is turned on.

14. The vehicle of claim 12, wherein the fastening of the seat belt is fastening of a seat belt of a seat where an occupant is present.

15. The vehicle of claim 11, wherein the controller is configured to:
alternately generate a driving force in a forward direction and a backward direction to the second wheel.

16. The vehicle of claim 15, wherein the driving force in the forward direction and the backward direction of the second wheel are maintained for a predetermined time period while linearly increasing a rotation speed of an engine of the vehicle from 0 revolutions per minute to a predetermined revolutions per minute greater than 0, and
in the seized release mode of the EPB, the controller is further configured to repeat the processes of claim 15 a predetermined number of times.

17. The vehicle of claim 15, wherein, in the seized release mode of the EPB, the controller is further configured to suspend, for a predetermined time period, constant monitoring to confirm a stoppage of the EPB of the vehicle.

18. The vehicle of claim 17, wherein the controller is further configured to resume, upon confirming that a seized state of the EPB is released, the constant monitoring of the EPB.

19. The vehicle of claim 17, wherein the controller is further configured to release, upon confirming that the seized state of the EPB is released, a braking state of the first wheel.

20. The vehicle of claim 11, wherein, in the seized release mode of the EPB, the controller is further configured to confirm an intention of a driver from the driver's approval to enter the seized release mode of the EPB.

* * * * *